(12) United States Patent
Heap et al.

(10) Patent No.: US 8,296,021 B2
(45) Date of Patent: Oct. 23, 2012

(54) METHOD FOR DETERMINING CONSTRAINTS ON INPUT TORQUE IN A HYBRID TRANSMISSION

(75) Inventors: Anthony H. Heap, Ann Arbor, MI (US); Tung-Ming Hsieh, Carmel, IN (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1037 days.

(21) Appl. No.: 12/254,961

(22) Filed: Oct. 21, 2008

(65) Prior Publication Data

US 2009/0118942 A1    May 7, 2009

Related U.S. Application Data

(60) Provisional application No. 60/985,225, filed on Nov. 3, 2007.

(51) Int. Cl.
G06F 7/00 (2006.01)

(52) U.S. Cl. ............................. 701/54; 701/36; 701/51

(58) Field of Classification Search .................. None
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1* | 4/2005 | Cawthorne et al. ............. 701/51 |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1* | 11/2005 | Heap et al. ........................ 477/3 |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |

(Continued)

Primary Examiner — Thomas Tarcza
Assistant Examiner — Nagi Murshed

(57) ABSTRACT

A hybrid transmission includes torque machines and an energy storage device connected thereto. Thee hybrid transmission is operative to transfer power between an input member and an output member and the torque machines. A method for controlling the hybrid transmission includes monitoring operating parameters of the hybrid transmission, monitoring an operator demand for power, determining an output torque range to the output member based upon states of the operating parameters of the hybrid transmission, constraining the output torque range to the output member based upon the operator demand for power, and determining input torque constraints to the input member based upon the constrained output torque range to the output member.

13 Claims, 7 Drawing Sheets

U.S. PATENT DOCUMENTS

| | | | |
|---|---|---|---|
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0194670 A1 | 8/2006 | Heap | |
| 2006/0195242 A1* | 8/2006 | Yamamoto et al. | 701/51 |
| 2007/0078580 A1 | 4/2007 | Cawthorne | |
| 2007/0093953 A1 | 4/2007 | Heap | |
| 2007/0149348 A1 | 6/2007 | Holmes | |
| 2007/0191181 A1 | 8/2007 | Burns | |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0263566 A1* | 11/2007 | McHenry et al. | 370/329 |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Zettel | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118074 A1 | 5/2009 | Zettel | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 | 5/2009 | Kaminsky | |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |
| 2009/0118090 A1 | 5/2009 | Heap | |
| 2009/0118091 A1 | 5/2009 | Lahti | |
| 2009/0118093 A1 | 5/2009 | Heap | |
| 2009/0118094 A1 | 5/2009 | Hsieh | |
| 2009/0118877 A1 | 5/2009 | Center | |
| 2009/0118879 A1 | 5/2009 | Heap | |
| 2009/0118880 A1 | 5/2009 | Heap | |
| 2009/0118882 A1 | 5/2009 | Heap | |
| 2009/0118883 A1 | 5/2009 | Heap | |
| 2009/0118884 A1 | 5/2009 | Heap | |
| 2009/0118885 A1 | 5/2009 | Heap | |
| 2009/0118886 A1 | 5/2009 | Tamai | |
| 2009/0118887 A1 | 5/2009 | Minarcin | |
| 2009/0118888 A1 | 5/2009 | Minarcin | |
| 2009/0118901 A1 | 5/2009 | Cawthorne | |
| 2009/0118914 A1 | 5/2009 | Schwenke | |
| 2009/0118915 A1 | 5/2009 | Heap | |
| 2009/0118916 A1 | 5/2009 | Kothari | |
| 2009/0118917 A1 | 5/2009 | Sah | |
| 2009/0118918 A1 | 5/2009 | Heap | |
| 2009/0118919 A1 | 5/2009 | Heap | |
| 2009/0118920 A1 | 5/2009 | Heap | |
| 2009/0118921 A1 | 5/2009 | Heap | |
| 2009/0118922 A1 | 5/2009 | Heap | |
| 2009/0118923 A1 | 5/2009 | Heap | |
| 2009/0118924 A1 | 5/2009 | Heap | |
| 2009/0118925 A1 | 5/2009 | Hsieh | |
| 2009/0118926 A1 | 5/2009 | Heap | |
| 2009/0118927 A1 | 5/2009 | Heap | |
| 2009/0118928 A1 | 5/2009 | Heap | |
| 2009/0118929 A1 | 5/2009 | Heap | |
| 2009/0118930 A1 | 5/2009 | Heap | |
| 2009/0118931 A1 | 5/2009 | Kaminsky | |
| 2009/0118932 A1 | 5/2009 | Heap | |
| 2009/0118933 A1 | 5/2009 | Heap | |
| 2009/0118934 A1 | 5/2009 | Heap | |
| 2009/0118935 A1 | 5/2009 | Heap | |
| 2009/0118936 A1 | 5/2009 | Heap | |
| 2009/0118937 A1 | 5/2009 | Heap | |
| 2009/0118938 A1 | 5/2009 | Heap | |
| 2009/0118939 A1 | 5/2009 | Heap | |

| | | | | | | |
|---|---|---|---|---|---|---|
| 2009/0118940 A1 | 5/2009 | Heap | | 2009/0118952 A1 | 5/2009 | Heap |
| 2009/0118941 A1 | 5/2009 | Heap | | 2009/0118954 A1 | 5/2009 | Wu |
| 2009/0118943 A1 | 5/2009 | Heap | | 2009/0118957 A1 | 5/2009 | Heap |
| 2009/0118944 A1 | 5/2009 | Heap | | 2009/0118962 A1 | 5/2009 | Heap |
| 2009/0118945 A1 | 5/2009 | Heap | | 2009/0118963 A1 | 5/2009 | Heap |
| 2009/0118946 A1 | 5/2009 | Heap | | 2009/0118964 A1 | 5/2009 | Snyder |
| 2009/0118947 A1 | 5/2009 | Heap | | 2009/0118969 A1 | 5/2009 | Heap |
| 2009/0118948 A1 | 5/2009 | Heap | | 2009/0118971 A1 | 5/2009 | Heap |
| 2009/0118949 A1 | 5/2009 | Heap | | 2009/0118999 A1 | 5/2009 | Heap |
| 2009/0118950 A1 | 5/2009 | Heap | | 2009/0144002 A1 | 6/2009 | Zettel |
| 2009/0118951 A1 | 5/2009 | Heap | | | | |

* cited by examiner

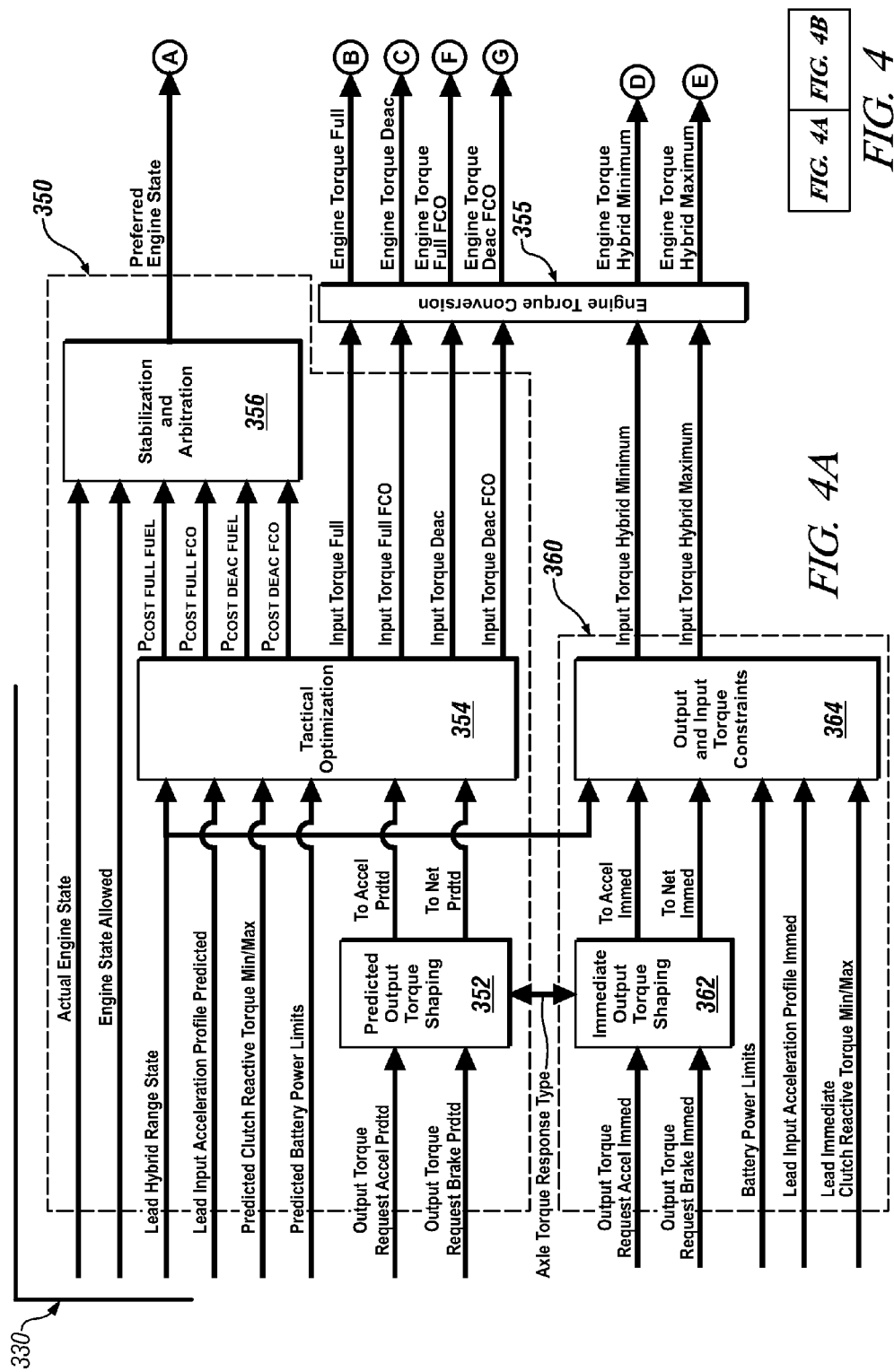

METHOD FOR DETERMINING CONSTRAINTS ON INPUT TORQUE IN A HYBRID TRANSMISSION

CROSS REFERENCE TO RELATED APPLICATIONS

This application claims the benefit of U.S. Provisional Application No. 60/985,225 filed on Nov. 3, 2007 which is hereby incorporated herein by reference.

TECHNICAL FIELD

This disclosure pertains to control systems for hybrid transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A hybrid transmission includes torque machines and an energy storage device connected thereto. Thee hybrid transmission is operative to transfer power between an input member and an output member and the torque machines. A method for controlling the hybrid transmission includes monitoring operating parameters of the hybrid transmission, monitoring an operator demand for power, determining an output torque range to the output member based upon states of the operating parameters of the hybrid transmission, constraining the output torque range to the output member based upon the operator demand for power, and determining input torque constraints to the input member based upon the constrained output torque range to the output member.

BRIEF DESCRIPTION OF THE DRAWINGS

One or more embodiments will now be described, by way of example, with reference to the accompanying drawings, in which.

DETAILED DESCRIPTION

Figure 1:
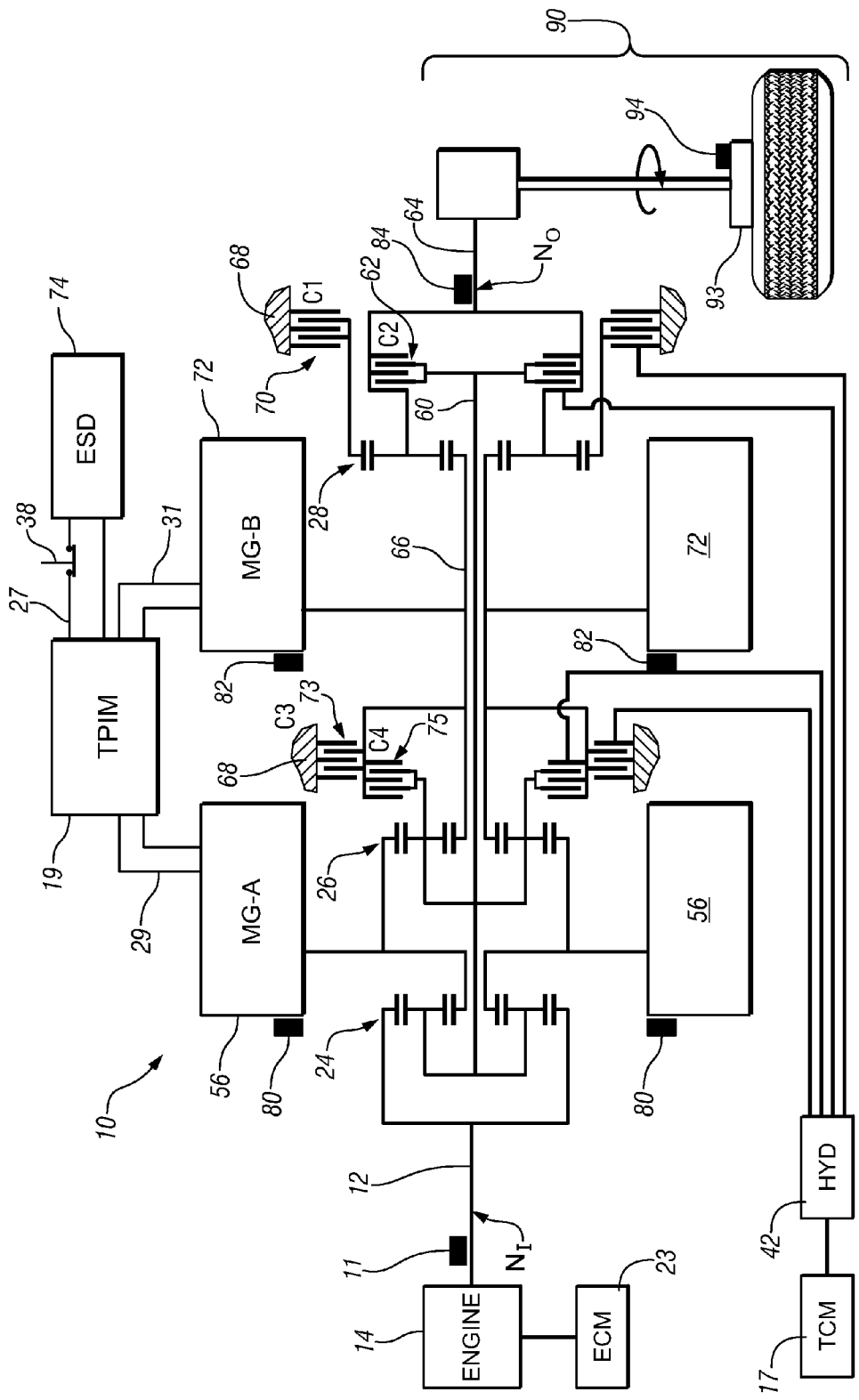
FIG. 1 is a schematic diagram of an exemplary powertrain, in accordance with the present disclosure.
Figure 2:
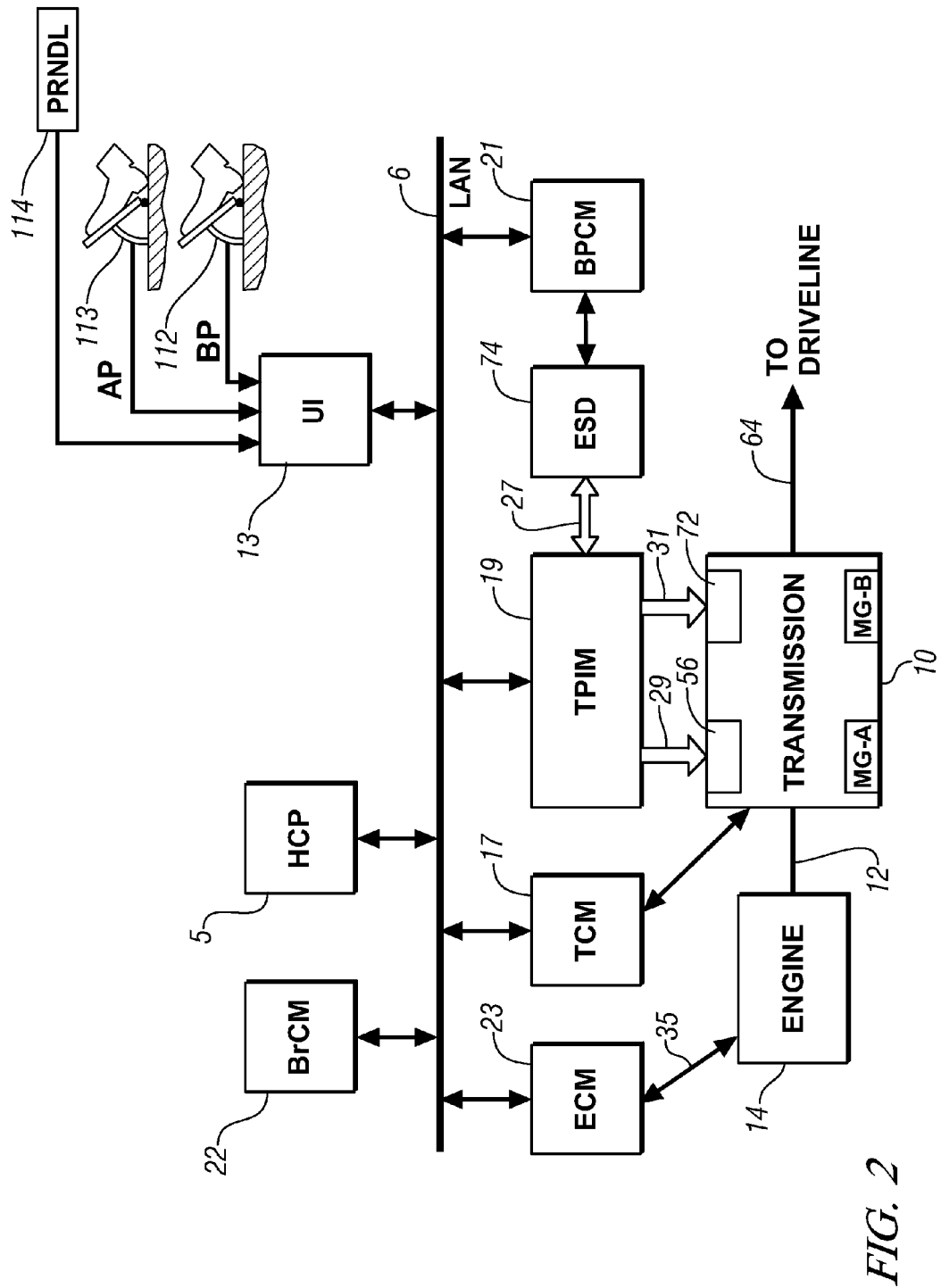
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72 in one embodiment. The engine 14 and the first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, reactive clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque $T_I$ provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include the reactive clutch torques for the clutches C1 70, C2 62, C3 73, and C4 75, and rotational output speed $N_O$ of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
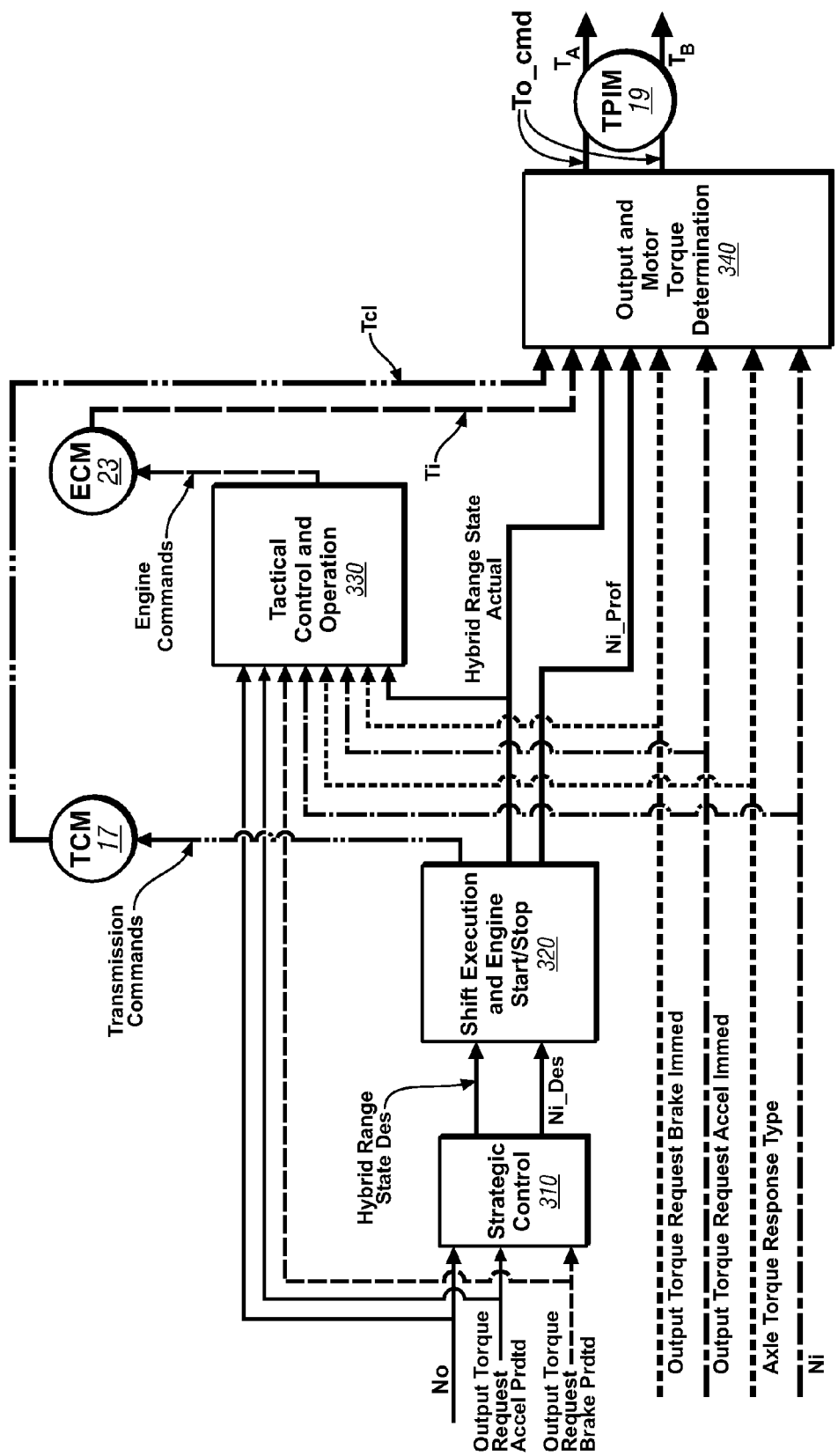
FIGS. 3-5 are schematic flow diagrams of a control system architecture for controlling and managing torque in a hybrid powertrain system, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque machines and energy storage systems, e.g., hydraulic-mechanical hybrid transmissions using hydraulically powered torque machines (not shown).

In operation, the operator inputs to the accelerator pedal 113 and the brake pedal 112 are monitored to determine the operator torque request. The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No').

The immediate accelerator output torque request comprises an immediate torque request determined based upon the operator input to the accelerator pedal 113. The control system controls the output torque from the hybrid powertrain system in response to the immediate accelerator output torque request to cause positive acceleration of the vehicle. The immediate brake output torque request comprises an immediate braking request determined based upon the operator input to the brake pedal 112. The control system controls the output torque from the hybrid powertrain system in response to the immediate brake output torque request to cause deceleration, or negative acceleration, of the vehicle. Vehicle deceleration effected by control of the output torque from the hybrid powertrain system is combined with vehicle deceleration effected by a vehicle braking system (not shown) to decelerate the vehicle to achieve the immediate braking request.

The immediate accelerator output torque request is determined based upon a presently occurring operator input to the accelerator pedal 113, and comprises a request to generate an immediate output torque at the output member 64 preferably to accelerate the vehicle. The immediate accelerator output torque request is unshaped, but can be shaped by events that affect vehicle operation outside the powertrain control. Such events include vehicle level interruptions in the powertrain control for antilock braking, traction control and vehicle stability control, which can be used to unshape or rate-limit the immediate accelerator output torque request.

The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

The immediate brake output torque request is determined based upon the operator input to the brake pedal 112 and the control signal to control the friction brakes to generate friction braking torque.

The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. As desired by a user, there can be operating conditions under which the predicted brake output torque request is set to zero, e.g., when the operator setting to the transmission gear selector 114 is set to a reverse gear, and when a transfer case (not shown) is set to a four-wheel drive low range. The operating conditions whereat the predicted brake output torque request is set to zero are those in which blended braking is not preferred due to vehicle operating factors.

The axle torque response type comprises an input state for shaping and rate-limiting the output torque response through the first and second electric machines 56 and 72. The input state for the axle torque response type can be an active state, preferably comprising one of a pleasability limited state a maximum range state, and an inactive state. When the commanded axle torque response type is the active state, the output torque command is the immediate output torque. Preferably the torque response for this response type is as fast as possible.

Blended brake torque includes a combination of the friction braking torque generated at the wheels 93 and the output torque generated at the output member 64 which reacts with the driveline 90 to decelerate the vehicle in response to the operator input to the brake pedal 112. The BrCM 22 commands the friction brakes on the wheels 93 to apply braking force and generates a command for the transmission 10 to create a negative output torque which reacts with the driveline 90 in response to the immediate braking request. Preferably the applied braking force and the negative output torque can decelerate and stop the vehicle so long as they are sufficient to overcome vehicle kinetic power at wheel(s) 93. The negative output torque reacts with the driveline 90, thus transferring torque to the electromechanical transmission 10 and the engine 14. The negative output torque reacted through the electro-mechanical transmission 10 can be transferred to the first and second electric machines 56 and 72 to generate electric power for storage in the ESD 74.

A strategic optimization control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic optimization control scheme 310. The strategic optimization control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle.

A tactical control scheme ('Tactical Control and Operation') 330 is repeatedly executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and a present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Figure 4B:
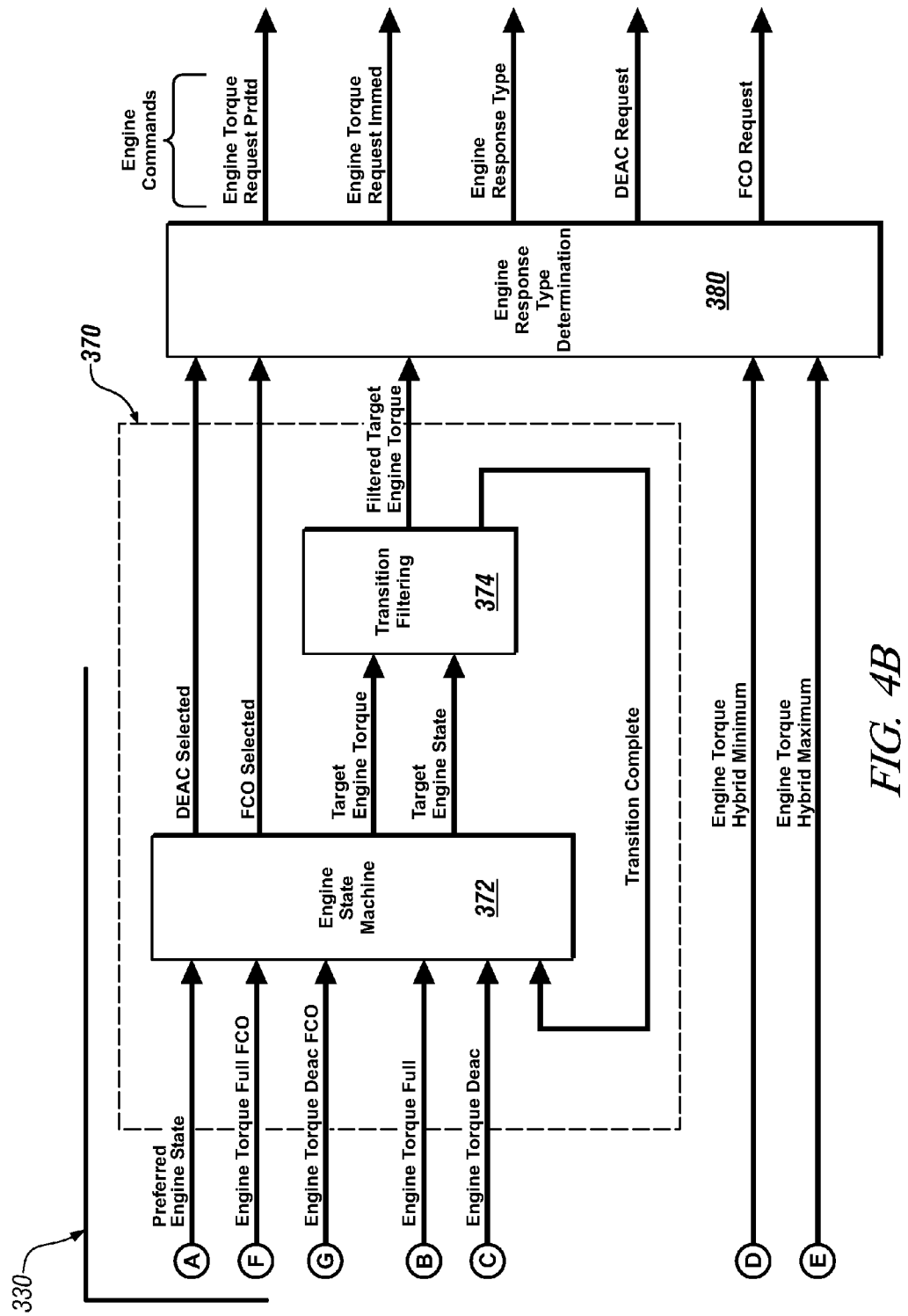

FIG. 4 details the tactical control scheme ('Tactical Control and Operation') 330 for controlling operation of the engine 14, described with reference to the hybrid powertrain system of FIGS. 1 and 2 and the control system architecture of FIG. 3. The tactical control scheme 330 includes a tactical optimization control path 350 and a system constraints control path 360 which are preferably executed concurrently. The outputs of the tactical optimization control path 350 are input to an engine state control scheme 370. The outputs of the engine state control scheme 370 and the system constraints control path 360 are input to an engine response type determination scheme ('Engine Response Type Determination') 380 for controlling the engine state, the immediate engine torque request and the predicted engine torque request.

The operating point of the engine 14 as described in terms of the input torque and input speed that can be achieved by controlling mass of intake air to the engine 14 when the engine 14 comprises a spark-ignition engine by controlling position of an engine throttle (not shown) utilizing an electronic throttle control device (not shown). This includes opening the throttle to increase the engine input speed and torque output and closing the throttle to decrease the engine input speed and torque. The engine operating point can be achieved by adjusting ignition timing, generally by retarding spark timing from a mean-best-torque spark timing to decrease engine torque.

When the engine 14 comprises a compression-ignition engine, the operating point of the engine 14 can be achieved by controlling the mass of injected fuel, and adjusted by retarding injection timing from a mean-best-torque injection timing to decrease engine torque.

The engine operating point can be achieved by changing the engine state between the engine-off state and the engine-on state. The engine operating point can be achieved by controlling the engine state between the all-cylinder state and the cylinder deactivation state, wherein a portion of the engine cylinders are unfueled and the engine valves are deactivated. The engine state can include the fuel cutoff state wherein the engine is rotating and unfueled to effect engine braking.

The tactical optimization control path 350 acts on substantially steady state inputs to select a preferred engine state and determine a preferred input torque from the engine 14 to the transmission 10. The inputs originate in the shift execution and engine operating state control scheme 320. The tactical optimization control path 350 includes an optimization scheme ('Tactical Optimization') 354 to determine preferred input torques for operating the engine 14 in the all-cylinder state ('Optimum Input Torque Full'), in the cylinder deactivation state ('Optimum Input Torque Deac'), the all-cylinder state with fuel cutoff ('Input Torque Full FCO'), in the cylinder deactivation state with fuel cutoff ('Input Torque Deac FCO'), and a preferred engine state ('Optimal Engine State'). Inputs to the optimization scheme 354 include a lead operating range state of the transmission 10 ('Lead Hybrid Range State') a predicted lead input acceleration profile ('Lead Input Acceleration Profile Predicted'), a predicted range of clutch reactive torques ('Predicted Clutch Reactive Torque Min/Max') for each presently applied clutch, predicted battery power limits ('Predicted Battery Power Limits') and predicted output torque requests for acceleration ('Output Torque Request Accel Prdtd') and braking ('Output Torque Request Brake Prdtd'). The predicted output torque requests for acceleration and braking are combined and shaped with the axle torque response type through a predicted output torque shaping filter 352 to yield a predicted net output torque request ('To Net Prdtd') and a predicted accelerator output torque request ('To Accel Prdtd'), which are inputs to the optimization scheme 354. The lead operating range state of the transmission 10 comprises a time-shifted lead of the operating range state of the transmission 10 to accommodate a response time lag between a commanded change in the operating range state and a measured change in the operating range state. The predicted lead input acceleration profile comprises a time-shifted lead of the predicted input acceleration profile of the input member 12 to accommodate a response time lag between a commanded change in the predicted input acceleration profile and a measured change in the predicted input acceleration profile. The optimization scheme 354 determines costs for operating the engine 14 in the engine states, which comprise operating the engine fueled and in the all-cylinder state ('$P_{COST\ FULL\ FUEL}$'), operating the engine unfueled and in the all-cylinder state ('$P_{COST\ FULL\ FCO}$'), operating the engine fueled and in cylinder deactivation state ('$P_{COST\ DEAC\ FUEL}$'), and operating the engine unfueled and in the cylinder deactivation state ('$P_{COST\ DEAC\ FCO}$'). The aforementioned costs for operating the engine 14 are input to a stabilization analysis scheme ('Stabilization and Arbitration') 356 along with the actual engine state ('Actual Engine State') and an allowable or permissible engine state ('Engine State Allowed') to select one of the engine states as the preferred engine state ('Optimal Engine State').

The preferred input torques for operating the engine 14 in the all-cylinder state and in the cylinder deactivation state with and without fuel cutoff are input to an engine torque conversion calculator 355 and converted to preferred engine torques in the all-cylinder state and in the cylinder deactivation state ('Engine Torque Full') and ('Engine Torque Deac') and with fuel cutoff in the all-cylinder state and in the cylinder deactivation state ('Engine Torque Full FCO') and ('Engine Torque Deac FCO') respectively, by taking into account parasitic and other loads introduced between the engine 14 and the transmission 10. The preferred engine torques for operation in the all-cylinder state and in the cylinder deactivation state and the preferred engine state comprise inputs to the engine state control scheme 370.

The costs for operating the engine 14 include operating costs which are generally determined based upon factors that include vehicle driveability, fuel economy, emissions, and battery usage. Costs are assigned and associated with fuel and electrical power consumption and are associated with a specific operating points of the hybrid powertrain. Lower operating costs are generally associated with lower fuel consumption at high conversion efficiencies, lower battery power usage, and lower emissions for each engine speed/load operating point, and take into account the present operating state of the engine 14.

The preferred engine state and the preferred engine torques in the all-cylinder state and in the cylinder deactivation state are input to the engine state control scheme 370, which includes an engine state machine ('Engine State Machine') 372. The engine state machine 372 determines a target engine torque ('Target Engine Torque') and a target engine state ('State') based upon the preferred engine torques and the preferred engine state. The target engine torque and the target engine state are input to a transition filter 374 which monitors any commanded transition in the engine state and filters the target engine torque to provide a filtered target engine torque ('Filtered Target Engine Torque'). The engine state machine 372 outputs a command that indicates selection of one of the cylinder deactivation state and the all-cylinder state ('DEAC Selected') and indicates selection of one of the engine-on state and the deceleration fuel cutoff state ('FCO Selected'). The selection of one of the cylinder deactivation state and the all-cylinder state and the selection of one of the engine-on state and the deceleration fuel cutoff state, the filtered target engine torque, and the minimum and maximum engine torques are input to the engine response type determination scheme 380.

The system constraints control path 360 determines constraints on the input torque, comprising minimum and maximum input torques ('Input Torque Hybrid Minimum' and 'Input Torque Hybrid Maximum') that can be reacted by the transmission 10. The minimum and maximum input torques are determined based upon constraints to the transmission 10 and the first and second electric machines 56 and 72, including clutch torques and battery power limits, which affect the capacity of the transmission 10 to react input torque during the current loop cycle. Inputs to the system constraints control path 360 include the immediate output torque request as measured by the accelerator pedal 113 ('Output Torque Request Accel Immed') and the immediate output torque request as measured by the brake pedal 112 ('Output Torque Request Brake Immed') which are combined and shaped with the axle torque response type through an immediate output torque shaping filter 362 to yield a net immediate output torque ('To Net Immed') and an immediate accelerator output torque ('To Accel Immed'). The net immediate output torque preferably comprises an arithmetic sum of the immediate output torque requests as measured by the accelerator pedal 113 and the immediate output torque request as measured by the brake pedal 112. The net immediate output torque and the immediate accelerator output torque are input to a constraints scheme ('Output and Input Torque Constraints'). Other inputs to the constraints scheme 364 include the present operating range state of the transmission 10, an immediate lead input acceleration profile ('Lead Input Acceleration Profile Immed'), a lead immediate clutch reactive torque range ('Lead Immediate Clutch Reactive Torque Min/Max') for each presently applied clutch, and the available battery power ('Battery Power Limits') comprising the range $P_{BAT\_MIN}$ to $P_{BAT\_MAX}$. The immediate lead input acceleration profile comprises a time-shifted lead of the immediate input acceleration profile of the input member 12 to accommodate a response time lag between a commanded change in the immediate input acceleration profile and a measured change in the immediate input acceleration profile. The lead immediate clutch reactive torque range comprises a time-shifted lead of the immediate clutch reactive torque range of the clutches to accommodate a response time lag between a commanded change in the immediate clutch torque range and a measured change in the immediate clutch reactive torque range. The constraints scheme 364 determines an output torque range for the transmission 10, and then determines the minimum and maximum allowable input torques ('Input Torque Hybrid Minimum' and 'Input Torque Hybrid Maximum' respectively) that can be reacted by the transmission 10 based upon the aforementioned inputs. The minimum and maximum allowable input torques can change during ongoing operation, due to changes in the aforementioned inputs, including increasing energy recovery through electric power regeneration through the transmission 14 and first and second electric machines 56 and 72.

The minimum and maximum allowable input torques are input to the engine torque conversion calculator 355 and converted to minimum and maximum engine torques ('Engine Torque Hybrid Minimum' and 'Engine Torque Hybrid Maximum' respectively), by taking into account parasitic and other loads introduced between the engine 14 and the transmission 10. The filtered target engine torque, the output of the engine state machine 372 and the engine minimum and maximum engine torques are input to the engine response type determination scheme 380, which inputs the engine commands to the ECM 23 for controlling the engine state, the immediate engine torque request and the predicted engine torque request. The engine commands include an immediate engine torque request ('Engine Torque Request Immed') and a predicted engine torque request ('Engine Torque Request Prdtd') that can be determined based upon the filtered target engine torque. Other commands control the engine state to one of the engine fueled state and the deceleration fuel cutoff state ('FCO Request') and to one of the cylinder deactivation state and the all-cylinder state ('DEAC Request'). Another output comprises an engine response type ('Engine Response Type'). When the filtered target engine torque is within the range between the minimum and maximum engine torques, the engine response type is inactive. When the filtered target engine torque is outside the constraints of the minimum and maximum engine torques ('Engine Torque Hybrid Minimum') and ('Engine Torque Hybrid Maximum') the engine response type is active, indicating a need for an immediate change in the engine torque, e.g., through engine spark control and retard to change the engine torque and the input torque to fall within the constraints of the minimum and maximum engine torques.

Figure 5:
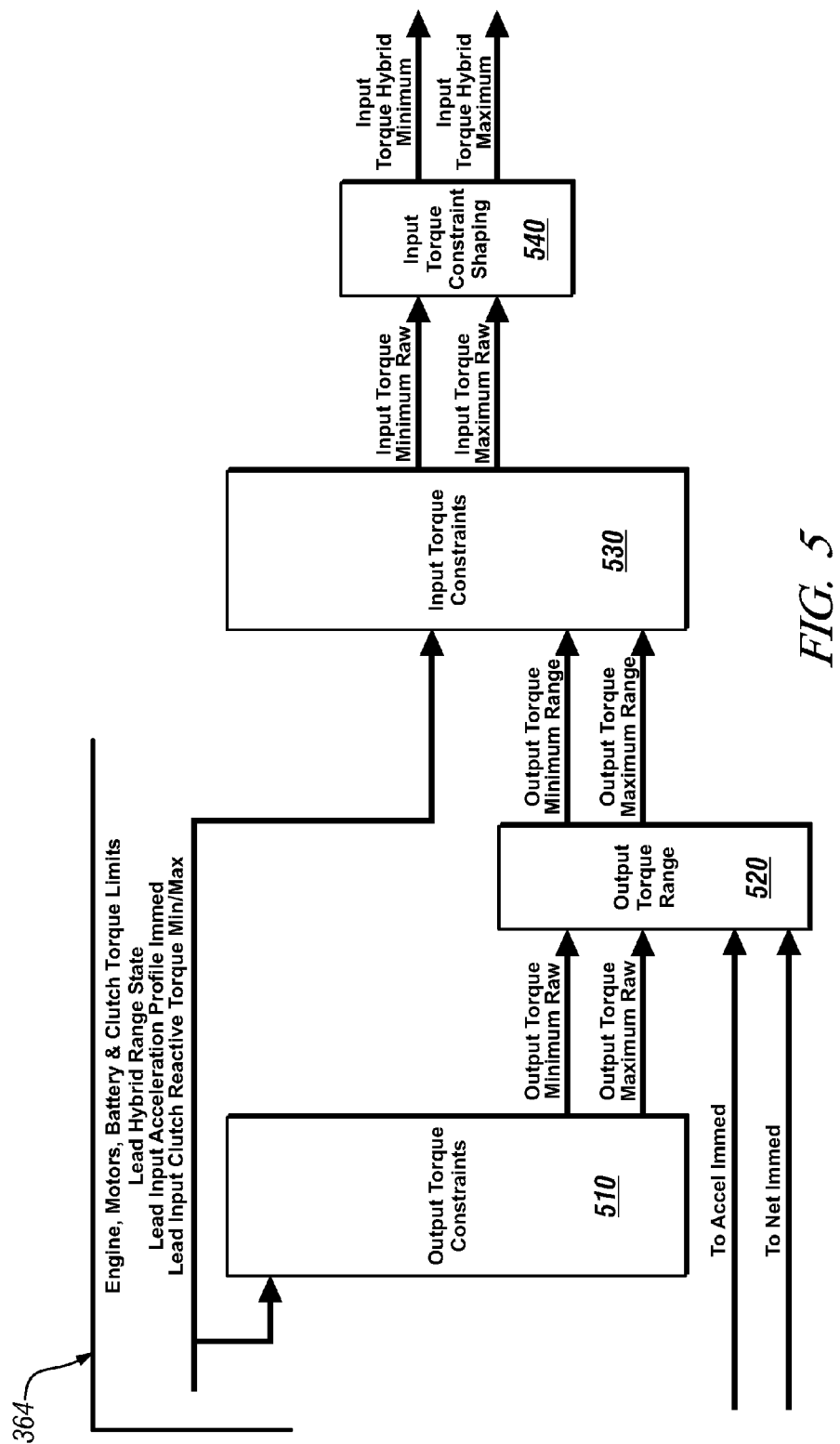
Figure 6:
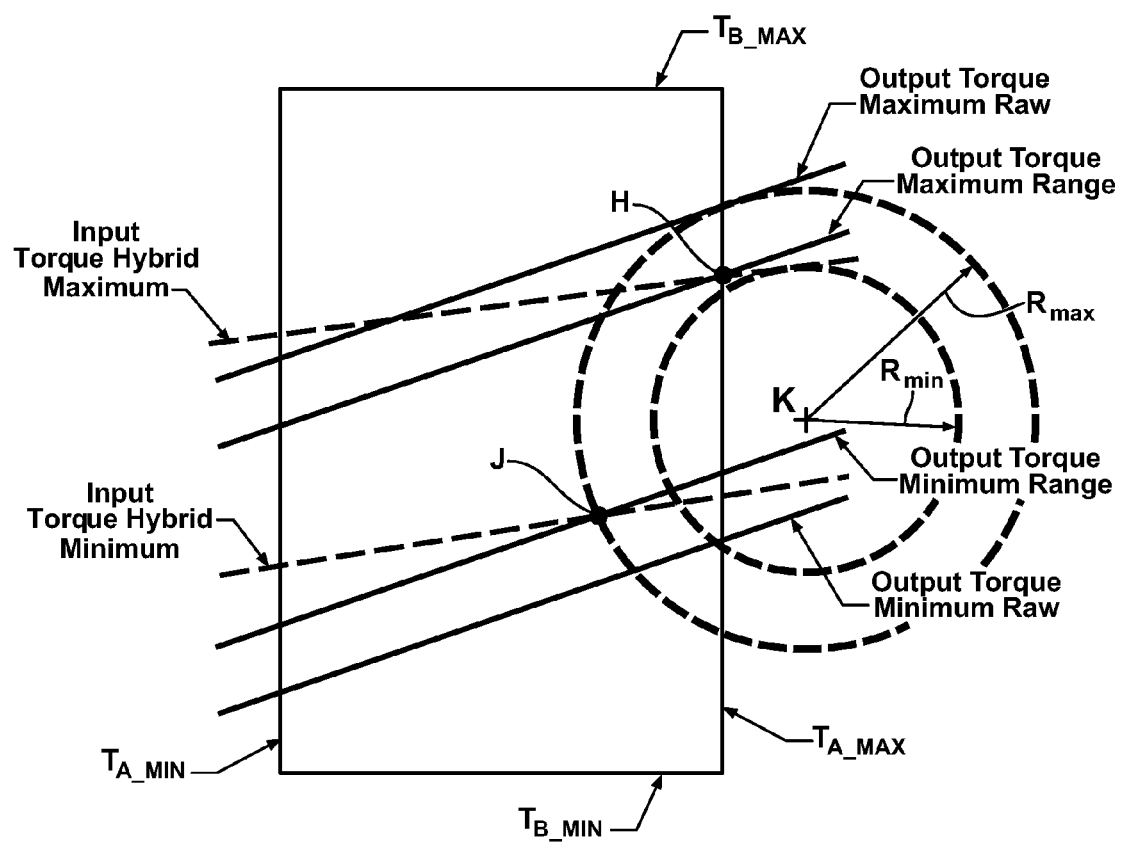
FIG. 6 is a graphical diagram, in accordance with the present disclosure.

FIG. 5 shows schematic details of the constraints scheme ('Output and Input Torque Constraints') 364 of the system constraints control path 360 of the tactical control scheme 330, the operation of which is shown graphically in FIG. 6. The constraints scheme 364 determines constraints on the input torque comprising the minimum and maximum input torques ('Input Torque Hybrid Minimum' and 'Input Torque Hybrid Maximum') to the input member 12 from the engine 14. The minimum and maximum input torques are determined based upon constraints to the transmission 10 and the first and second electric machines 56 and 72, including the reactive clutch torques and battery power limits which affect the capacity of the transmission 10 to react the input torque. Inputs to the system constraints control path 360 include the immediate output torque request as measured by the accelerator pedal 113 ('Output Torque Request Accel Immed') and the immediate output torque request as measured by the brake pedal 112 ('Output Torque Request Brake Immed') which are combined and shaped with the axle torque response type through an immediate output torque shaping filter 362 to yield the net immediate output torque ('To Net Immed') and the immediate accelerator output torque ('To Accel Immed'). Other inputs to the constraints scheme 364 include a lead operating range state of the transmission 10 ('Lead Hybrid Range State'), a lead immediate input acceleration profile ('Lead Input Acceleration Profile Immed'), a lead immediate clutch reactive torque range ('Lead Immediate Clutch Reactive Torque Min/Max') for applied clutches C1 70, C2 62, C3 73, and C4 75, and the available battery power ('Battery Power Limits') comprising the range $P_{BAT\_MIN}$ to $P_{BAT\_MAX}$. The lead immediate input acceleration profile comprises the immediate input acceleration profile of the input member 12 that is time-shifted to accommodate a response time lag between a commanded change in the immediate input acceleration profile and a measured change in the immediate input acceleration profile. The lead immediate clutch reactive torque range comprises the immediate clutch reactive torque range of the clutches that is time-shifted to accommodate a response time lag between a commanded change in the immediate clutch torque range and a measured change in the immediate clutch reactive torque range. The lead operating range state of the transmission 10 comprises a time-shifted operating range state of the transmission to accommodate a response time lag between a commanded change in the operating range state and measured operating range state. The parameters designated as 'lead' are used to accommodate concurrent transfer of torque through the powertrain converging at the common output member 64 using devices having varying response times. Specifically, the engine 14 can have a response time of an order of magnitude of 300-600 ms, and each of the torque transfer clutches C1 70, C2 62, C3 73, and C4 75 can have response times of an order of magnitude of 150-300 ms, and the first and second electric machines 56 and 72 can have response time of an order of magnitude of 10 ms.

An output torque constraint algorithm 510 determines minimum and maximum raw output torque constraints ('Output Torque Minimum Raw' and 'Output Torque Maximum Raw') based upon the lead operating range state of the transmission 10, the immediate lead input acceleration profile, the lead immediate clutch reactive torque range for each presently applied clutch, and the available battery power, and other parameters including motor torque limits.

The minimum and maximum raw output torques are circumscribed by the operator torque request, specifically, the net immediate output torque and the immediate accelerator output torque. An output torque range algorithm ('Output Torque Range') 520 is executed to determine an output torque range comprising a minimum output torque and a maximum output torque based upon the minimum and maximum raw output torques further limited by the immediate and net acceleration torque requests. An input torque constraints algorithm ('Input Torque Constraints') 530 is executed to determine minimum and maximum raw input torques ('Input Torque Minimum Raw' and 'Input Torque Maximum Raw') which can be shaped using a shaping algorithm ('Input Torque Constraint Shaping') 540 to determine minimum and maximum input torques ('Input Torque Hybrid Minimum' and 'Input Torque Hybrid Maximum').

The output torque constraints algorithm 510 determines the output torque range comprising the raw minimum and maximum output torques. The engine 14 and transmission 10 are controlled to generate the output torque at the output member 64 constrained by power, torque and speed limits of the engine 14, the first and second electric machines 56 and 72, the electrical storage device 74 and the applied clutches C1 70, C2 62, C3 73, or C4 75 depending on the operating range state. The operating constraints on the engine 14 and transmission 10 can be translated to a set of system constraint equations executed as one or more algorithms in one of the control modules, e.g., the HCP 5.

The transmission 10 operates in one of the operating range states through selective application of the torque-transfer clutches in one embodiment. Torque constraints for each of the engine 14 and the first and second electric machines 56 and 72 and speed constraints for each of the engine 14 and the first and second electric machines 56 and 72 are determined. Battery power constraints for the ESD 74 are determined, and are applied to further limit operation of the first and second electric machines 56 and 72. The preferred operating region for the powertrain is determined using the system constraint equations that are based upon the battery power constraints, the motor torque constraints, the speed constraints, and clutch reactive torque constraints. The preferred operating region comprises a range of permissible operating torques or speeds for the engine 14 and the first and second electric machines 56 and 72. By deriving and simultaneously solving dynamics equations of the transmission 10, the torque constraint comprising maximum and minimum output torque in this embodiment can be determined. The output torque can be formulated in a parametric torque equation as follows, using Eq. 1:

$$T_{M1} = T_A \text{ to } T_{M1} * T_A + T_B \text{ to } T_{M1} * T_B + \text{Misc\_}T_{M1} \quad [1]$$

wherein $T_{M1}$ is the output torque. The output torque range is subject to constraints expressed as parametric torque equations $T_{M2}$ and $T_{M3}$ that are formulated into Eqs. 2 and 3:

$$T_{M2} = T_A \text{ to } T_{M2} * T_A + T_B \text{ to } T_{M2} * T_B + \text{Misc\_}T_{M2} \quad [2]$$

$$T_{M3} = T_A \text{ to } T_{M3} * T_A + T_B \text{ to } T_{M3} * T_B + \text{Misc\_}T_{M3} \quad [3]$$

wherein $T_A$ to $T_{M1}$, $T_A$ to $T_{M2}$, and $T_A$ to $T_{M3}$ are contributing factors of $T_A$ to $T_{M1}$, $T_{M2}$, $T_{M3}$, respectively, $T_B$ to $T_{M1}$, $T_B$ to $T_{M2}$, and $T_B$ to $T_{M3}$ are contributing factors of $T_B$ to $T_{M1}$, $T_{M2}$, $T_{M3}$, respectively, Misc\_$T_{M1}$, Misc\_$T_{M2}$, and Misc\_$T_{M3}$ are constants which contribute to $T_{M1}$, $T_{M2}$, $T_{M3}$ by non $T_A$, $T_B$, $T_{M1}$, $T_{M2}$ and $T_{M3}$ parameters such as time-rate changes in speed of the input member 12, time-rate changes in speed of the output member 64, and slip speed(s) of the torque-transfer clutches C1 70, C2 62, C3 73, C4 75 depending on the applications, and $T_A$ and $T_B$ are the motor torques from the first and second electric machines 56 and 72.

Eqs. 1, 2, 3 are formulated to effect searches, with $T_{M1}$, $T_{M2}$, and $T_{M3}$ comprising three independently controllable parameters selected depend upon the solution being sought. In searching minimum and maximum raw output torques in block 510, the parametric equations $T_{M1}$, $T_{M2}$, $T_{M3}$ are formulated based upon combinations of the output torque $T_O$, the input torque $T_I$, clutch torques $T_{C1}$, $T_{C2}$, $T_{C3}$, and $T_{C4}$ for the reactive torque transferred across the torque-transfer clutches C1 70, C2 62, C3 73, C4 75 of the transmission 10 respectively, and input shaft acceleration Nidot, output shaft acceleration Nodot, and clutch slip speed Ncdot. The miscellaneous terms, which are constants at any instant, are as follows.

Misc\_Tm1: amount contributed to $T_{M1}$ by other variables except $T_A$, $T_B$, $T_{M1}$, $T_{M2}$ and $T_{M3}$, Misc\_Tm2: amount contributed to $T_{M2}$ by other variables except $T_A$, $T_B$, $T_{M1}$, $T_{M2}$ and $T_{M3}$, and Misc\_Tm3: amount contributed to $T_{M3}$ by other variables except $T_A$, $T_B$, $T_{M1}$, $T_{M2}$ and $T_{M3}$.

The output torque range, comprising the minimum and maximum output torques, is determined based upon the commanded output torque, as follows. The parametric torque equation $T_{M1}$ described in Eq. 1 can be searched to determine a range comprising a maximum and a minimum output torque subject to the parametric torque equations $T_{M2}$ and $T_{M3}$ which comprise torque constraints determined based upon the motor torques, the battery torques, and the other constraints described with reference to Eqs. 2 and 3.

When the lead operating range state of the transmission 10 is in Mode 1, the parametric torque equations of Eqs. 1, 2, and 3 are rewritten as follows:

$$T_{M1}=T_O=T_A \text{ to } T_O*T_A+T_B \text{ to } T_O*T_O+\text{Misc\_}T_O \quad [1A]$$

$$T_{M2}=T_I=T_A \text{ to } T_I*T_A+T_B \text{ to } T_I*T_B+\text{Misc\_}T_I \quad [2A]$$

$$T_{M3}=T_{C1}=T_A \text{ to } T_{C1}*T_A+T_B \text{ to } T_{C1}*T_B+\text{Misc\_}T_{C1} \quad [3A]$$

When the lead operating range state of the transmission 10 is in Mode 2, the parametric torque equations of Eqs. 1, 2, and 3 are rewritten as follows:

$$T_{M1}=T_O=T_A \text{ to } T_O*T_A+T_B \text{ to } T_O*T_O+\text{Misc\_}T_O \quad [1B]$$

$$T_{M2}=T_I=T_A \text{ to } T_I*T_A+T_B \text{ to } T_I*T_B+\text{Misc\_}T_I \quad [2B]$$

$$T_{M3}=T_{C2}=T_A \text{ to } T_{C2}*T_A+T_B \text{ to } T_{C2}*T_B+\text{Misc\_}T_{C2} \quad [3B]$$

When the lead operating range state of the transmission 10 is in G1, the parametric torque equations of Eqs. 1, 2, and 3 are rewritten as follows.

$$T_{M1}=T_O=T_A \text{ to } T_O*T_A+T_B \text{ to } T_O*T_O+\text{Misc\_}T_O \quad [1C]$$

$$T_{M2}=T_{C1}=T_A \text{ to } T_{C1}*T_A+T_B \text{ to } T_{C1}*T_B+\text{Misc\_}T_{C1} \quad [2C]$$

$$T_{M3}=T_{C4}=T_A \text{ to } T_{C4}*T_A+T_B \text{ to } T_{C4}*T_B+\text{Misc\_}T_{C4} \quad [3C]$$

When the lead operating range state of the transmission 10 is in G2, the parametric torque equations of Eqs. 1, 2, and 3 are rewritten as follows.

$$T_{M1}=T_O=T_A \text{ to } T_O*T_A+T_B \text{ to } T_O*T_O+\text{Misc\_}T_O \quad [1D]$$

$$T_{M2}=T_{C1}=T_A \text{ to } T_{C1}*T_A+T_B \text{ to } T_{C1}*T_B+\text{Misc\_}T_{C1} \quad [2D]$$

$$T_{M3}=T_{C2}=T_A \text{ to } T_{C4}*T_A+T_B \text{ to } T_{C2}*T_B+\text{Misc\_}T_{C2} \quad [3D]$$

When the lead operating range state of the transmission 10 is in G3, the parametric torque equations of Eqs. 1, 2, and 3 are rewritten as follows:

$$T_{M1}=T_O=T_A \text{ to } T_O*T_A+T_B \text{ to } T_O*T_O+\text{Misc\_}T_O \quad [1E]$$

$$T_{M2}=T_{C2}=T_A \text{ to } T_{C4}*T_A+T_B \text{ to } T_{C2}*T_B+\text{Misc\_}T_{C2} \quad [2E]$$

$$T_{M3}=T_{C4}=T_A \text{ to } T_{C4}*T_A+T_B \text{ to } T_{C4}*T_B+\text{Misc\_}T_{C4} \quad [3E]$$

When the lead operating range state of the transmission 10 is in G4, the parametric torque equations of Eqs. 1, 2, and 3 are rewritten as follows:

$$T_{M1}=T_O=T_A \text{ to } T_O*T_A+T_B \text{ to } T_O*T_O+\text{Misc\_T}_O \quad [1F]$$

$$T_{M2}=T_{C2}=T_A \text{ to } T_{C4}*T_A+T_B \text{ to } T_{C2}*T_B+\text{Misc\_}T_{C2} \quad [2F]$$

$$T_{M3}=T_{C3}=T_A \text{ to } T_{C3}*T_A+T_B \text{ to } T_{C3}*T_B+\text{Misc\_}T_{C3} \quad [3F]$$

When the lead operating range state of the transmission 10 is in neutral, the parametric torque equations of Eqs. 1, 2, and 3 are rewritten as follows:

$$T_{M1}=T_O=T_A \text{ to } T_O*T_A+T_B \text{ to } T_O*T_O+\text{Misc\_}T_O \quad [1G]$$

$$T_{M2}=T_I=T_A \text{ to } T_I*T_A+T_B \text{ to } T_I*T_B+\text{Misc\_}T_I \quad [2G]$$

$$T_{M3}=T_{C1}=T_A \text{ to } T_{C1}*T_A+T_B \text{ to } T_{C1}*T_B+\text{Misc\_}T_{C1} \quad [3G]$$

The engine 14 and transmission 10 and the first and second electric machines 56 and 72 have speed constraints, torque constraints, and battery power constraints due to mechanical and system limitations. The speed constraints can include engine speed constraints of $N_I$=0 (engine off state), and $N_I$ ranging from 600 rpm (idle) to 6000 rpm for the engine 14.

The speed constraints for the first and second electric machines 56 and 72 for this embodiment can range as follows:
−10,500 rpm$\leq N_A \leq$+10,500 rpm, and
−10,500 rpm$\leq N_B \leq$+10,500 rpm The speed constraints can vary based upon specific operating points.

The torque constraints include motor torque constraints for the first and second electric machines 56 and 72 including $T_{A\_MIN} \leq T_A \leq T_{A\_MAX}$ and $T_{B\_MIN} \leq T_B \leq T_{B\_MAX}$. The motor torque constraints $T_{A\_MAX}$ and $T_{A\_MIN}$ comprise torque limits for the first electric machine 56 when working as a torque motor and an electric generator at positive rotational speeds, respectively. The motor torque constraints $T_{B\_MAX}$ and $T_{B\_MIN}$ comprise torque limits for the second electric machine 72 when working as a torque motor and an electric generator at positive rotational speeds, respectively. The maximum and minimum motor torques $T_{A\_MAX}$, $T_{A\_MIN}$, $T_{B\_MAX}$, and $T_{B\_MIN}$ are preferably obtained from data sets stored in tabular format within one of the memory devices of one of the control modules. Such data sets can be empirically derived from conventional dynamometer testing of the combined motor and power electronics, e.g., the TPIM 19, at various temperature and voltage conditions. Battery power constraints comprise the available battery power within the range of $P_{BAT\_MIN}$ to $P_{BAT\_MAX}$, wherein $P_{BAT\_MIN}$ is maximum allowable battery charging power and $P_{BAT\_MAX}$ is the maximum allowable battery discharging power. The operation of the system described hereinbelow is determined at known engine input speeds and torques, and thus the derivation of the equations is based upon torque transfer within the transmission 14.

An operating range, comprising a torque output range is determinable based upon the battery power constraints of the ESD 74. Calculation of battery power usage, $P_{BAT}$ is as follows:

$$P_{BAT}=P_{A,ELEC}+P_{B,ELEC}+P_{DC\_LOAD} \quad [4]$$

wherein $P_{A,ELEC}$ comprises electrical power from the first electric machine 56,
  $P_{B,ELEC}$ comprises electrical power from the second electric machine 72, and
  $P_{DC\_LOAD}$ comprises known DC load, including accessory loads.

Substituting equations for $P_{A,ELEC}$ and $P_{B,ELEC}$, yields the following equation:

$$P_{BAT}=(P_{A,MECH}+P_{A,LOSS})+(P_{B,MECH}+P_{B,LOSS})+P_{DC\_LOAD} \quad [5]$$

wherein $P_{A,MECH}$ comprises mechanical power from the first electric machine 56,
  $P_{A,LOSS}$ comprises power losses from the first electric machine 56,
  $P_{B,MECH}$ comprises mechanical power from the second electric machine 72, and
  $P_{B,LOSS}$ comprises power losses from the second electric machine 72.

Eq. 5 can be restated as Eq. 6, below, wherein speeds, $N_A$ and $N_B$, and torques, $T_A$ and $T_B$, are substituted for powers $P_A$ and $P_B$. This includes an assumption that motor and inverter losses can be mathematically modeled as a quadratic equation based upon torque, as follows:

$$P_{BAT}=(N_A T_A+(a_1(N_A)T_A^2+a_2(N_A)T_A+a_3(N_A)))+(N_B T_B+(\beta_1(N_B)T_B^2+\beta_2(N_B)T_B+\beta_3(N_B)))+PDC\_LOAD \quad [6]$$

wherein $N_A$, $N_B$ comprise motor speeds for the first and second electric machines 56 and 72, $T_A$, $T_B$ comprise the motor torques for the first and second electric machines 56 and 72, and a1, a2, a3, b1, b2, b3 each comprise quadratic coefficients which are a function of respective motor speeds, $N_A$, $N_B$.

This can be restated as follows:

$$P_{BAT}=a_1*T_A^2+(N_A+a_2)*T_A+b_1*T_B^2+(N_B+b_2)*T_B+a3+b3+P_{DC\_LOAD} \quad [7]$$

This reduces to:

$$P_{BAT}=a_1[T_A^2+T_A(N_A+a_2)/a_1+((N_A+a_2)/(2*a_1))^2]+b_1[T_B^2+T_B(N_B+b_2)/b_1+((N_B+b_2)/(2*b_1))^2]+a3+b3+P_{DC\_LOAD}-(N_A+a_2)^2/(4*a_1)-(N_B+b_2)^2/(4*b_1) \quad [8]$$

This reduces to:

$$P_{BAT}=a_1[T_A+(N_A+a_2)/(2*a_1)]^2+b_1[T_B+(N_B+b_2)/(2*b_1)]^2+a3+b3+P_{DC\_LOAD}-(N_A+a_2)^2/(4*a_1)-(N_B+b_2)^2/(4*b_1) \quad [9]$$

This reduces to:

$$P_{BAT}=[SQRT(a_1)*T_A+(N_A+a_2)/(2*SQRT(a_1))]^2+[SQRT(b_1)*T_B+(N_B+b_2)/(2*SQRT(b_1))]^2+a3+b3+P_{DC\_LOAD}-(N_A+a_2)^2/(4*a_1)-(N_B+b_2)^2/(4*b_1) \quad [10]$$

This reduces to:

$$P_{BAT}=(A_1*T_A+A_2)^2+(B_1*T_B+B_2)^2+C \quad [11]$$

wherein $A_1=SQRT(a_1)$, $B_1=SQRT(b_1)$, $A_2=(N_A+a_2)/(2*SQRT(a_1))$, $B_2=(N_B+b_2)/(2*SQRT(b_1))$, and $C=a_3+b_3+P_{DC\_LOAD}-(N_A+a_2)^2/(4*a_1)-(N_B+b_2)^2/(4*b_1)$.

This can be restated as:

$$P_{BAT}=P_{A\_ELEC}+P_{B\_ELEC}+P_{DC\_LOAD} \quad [11A]$$

wherein $P_{A\_ELEC}=(A_1*T_A+A_2)^2+C_A$, and $P_{B\_ELEC}=(B_1*T_B+B_2)^2+C_B$ wherein $C_A=a_3-(N_A+a_2)^2/(4*a_1)$ and $C_B=b_3-(N_B+b_2)^2/(4*b_1)$, and $C=C_A+C_B+P_{DC\_LOAD}$ The motor torques $T_A$ and $T_B$ can be transformed to the $T_X$ and $T_Y$ as follows:

$$\begin{bmatrix} T_X \\ T_Y \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix} \quad [12]$$

wherein $T_X$ is the transformation of $T_A$,
$T_Y$ is the transformation of $T_B$, and
$A_1, A_2, B_1, B_2$ comprise application-specific scalar values.
Eq. 11 further reduces to the following.

$$P_{BAT}=(T_X^2+T_Y^2)+C \quad [13]$$

$$P_{BAT}=R^2+C \quad [14]$$

Eq. 12 specifies the transformation of motor torque, $T_A$ to $T_X$ and the transformation of motor torque $T_B$ to $T_Y$. Thus, a new coordinate system referred to as $T_X/T_Y$ space is defined, and Eq. 13 comprises battery power $P_{BAT}$ transformed into $T_X/T_Y$ space. Therefore, the available battery power between maximum and minimum battery powers $P_{BAT\_MAX}$ and $P_{BAT\_MIN}$ can be calculated and graphed as radii ('$R_{MAX}$' and '$R_{MIN}$') with a center at locus (0, 0) in the $T_X/T_Y$ space, and designated by the letter K, wherein:

$$R_{MIN}=SQRT(P_{BAT\_MIN}-C)$$

$$R_{MAX}=SQRT(P_{BAT\_MAX}-C)$$

The minimum and maximum battery powers, $P_{BAT\_MIN}$ and $P_{BAT\_MAX}$, are preferably correlated to various conditions, e.g. state of charge, temperature, voltage and usage (amp-hour/hour). The parameter C, above, is defined as the absolute minimum possible battery power at given motor speeds, $N_A$, $N_B$, ignoring motor torque limits. Physically, when $T_A=0$ and $T_B=0$ the mechanical output power from the first and second electric machines 56 and 72 is zero. Physically $T_X=0$ and $T_Y=0$ corresponds to a maximum charging power condition for the ESD 74. The positive sign ('+') is defined as discharging power from the ESD 74, and the negative sign ('−') is defined as charging power into the ESD 74. $R_{MAX}$ defines a maximum battery power typically a discharging power, and $R_{MIN}$ defines a minimum battery power, typically a charging power.

The forgoing transformations to the $T_X/T_Y$ space, designated by a second coordinate system K, are shown in FIG. 6, with representations of the battery power constraints as concentric circles having radii of $R_{Min}$ and $R_{Max}$ and linear representations of the motor torque constraints ('$T_{A\_MIN}$', '$T_{A\_MAX}$', '$T_{B\_MIN}$', and '$T_{B\_MAX}$') circumscribing an allowable operating region. Analytically, the transformed vector $[T_X/T_Y]$ determined in Eq. 12 is solved simultaneously with the vector defined in Eq. 13 to identify a range of allowable torques in the $T_X/T_Y$ space which are made up of motor torques $T_A$ and $T_B$ constrained by the minimum and maximum battery powers $P_{BAT\_MIN}$ to $P_{BAT\_MAX}$. The range of allowable motor torques in the $T_X/T_Y$ space is shown with reference to FIG. 6.

A constant torque line can be defined in the $T_X/T_Y$ space, comprising the limit torque $T_{M1}$, described in Eq. 1, above. As previously stated, the parametric torque equation $T_{M1}$ comprises the output torque $T_O$ in this embodiment and Eqs. 1, 2, and 3 are restated in the $T_X/T_Y$ space as follows.

$$T_{M1}=T_A \text{ to } T_M*(T_X-A_2)/A_1+T_B \text{ to } T_{M1}*(T_Y-B_2)/B_1+\text{Misc}\_T_{M1} \quad [15]$$

$$T_{M2}=T_A \text{ to } T_{M2}*(T_X-A_2)/A_1+T_B \text{ to } T_{M2}*(T_Y-B_2)/B_1+\text{Misc}\_T_{M2} \quad [16]$$

$$T_{M3}=T_A \text{ to } T_{M3}*(T_X-A_2)/A_1+T_B \text{ to } T_{M3}*(T_Y-B_2)/B_1+\text{Misc}\_T_{M3} \quad [17]$$

Defining $T_{M1\_XY}$, $T_{M2\_XY}$, $T_{M3\_XY}$ as parts of $T_{M1}$, $T_{M2}$, and $T_{M3}$, contributed by $T_A$ and $T_B$ only, then:

$$T_{M1\_XY}=T_A \text{ to } T_{M1}*(T_X-A_2)/A_1+T_B \text{ to } T_{M1}*(T_Y-B_2)/B_1 \quad [18]$$

$$T_{M2\_XY}=T_A \text{ to } T_{M2}*(T_X-A_2)/A_1+T_B \text{ to } T_{M2}*(T_Y-B_2)/B_1 \quad [19]$$

$$T_{M3\_XY}=T_A \text{ to } T_{M3}*(T_X-A_2)/A_1+T_B \text{ to } T_{M3}*(T_Y-B_2)/B_1 \quad [20]$$

The following coefficients can be defined:

$T_X \text{ to } T_{M1}=T_A \text{ to } T_{M1}/A_1$;

$T_Y \text{ to } T_{M1}=T_B \text{ to } T_{M1}/B_1$;

$T_{M1}\_\text{Intercept}=T_A \text{ to } T_{M1}*A_2/A_1+T_B \text{ to } T_{M1}*B_2/B_1$;

$T_X \text{ to } T_{M2}=T_A \text{ to } T_{M2}/A_1$;

$T_Y$ to $T_{M2}=T_B$ to $T_{M2}/B_1$;

$T_{M2}$_Intercept$=T_A$ to $T_{M2}*A_2/A_1+T_B$ to $T_{M2}*B_2/B_1$;

$T_X$ to $T_{M3}=T_A$ to $T_{M3}/A_1$;

$T_Y$ to $T_{M3}=T_B$ to $T_{M3}/B_1$; and $T_{M3}$_Intercept$=T_A$ to $T_{M3}*A_2/A_1+T_B$ to $T_{M3}*B_2/B_1$.

Thus, the parametric torque equations of Eqs. 1, 2, and 3 are transformed to $T_X/T_Y$ space as follows:

$$T_{M1\_XY}=T_X \text{ to } T_{M1}*T_X+T_Y \text{ to } T_{M1}*T_Y+T_{M1}\_\text{Intercept} \quad [21]$$

$$T_{M2\_XY}=T_X \text{ to } T_{M2}*T_X+T_Y 2T_{M2}*T_Y+T_{M2}\_\text{Intercept} \quad [22]$$

$$T_{M3\_XY}=T_X \text{ to } T_{M3}*T_X+T_Y \text{ to } T_{M3}*T_Y+T_{M3}\_\text{Intercept} \quad [23]$$

Eqs. 21, 22, and 23, representing the parametric torque equations $T_{M1}$, $T_{M2}$, and $T_{M3}$ transformed to Tx/Ty space, are simultaneously solved to determine minimum and maximum values for $T_{M1}$ constrained by $T_{M2}$ and $T_{M3}$.

FIG. 6 graphically shows the battery power constraints ('$R_{min}$' and '$R_{max}$'), and the motor torque constraints for the first and second electric machines 56 and 72 comprising maximum and minimum motor torques for the first and second electric machines 56 and 72 ('$T_{A\_MAX}$', '$T_{A\_MIN}$', '$T_{B\_MAX}$', '$T_{B\_MIN}$'), plotted in $T_X/T_Y$ space. The parametric torque equations derived using the speed constraints, motor torque constraints, and battery power constraints can be simultaneously solved to determine the maximum and minimum raw output torques in $T_X/T_Y$ space, comprising $T_{M1\_XY}$ Max and $T_{M1\_XY}$ Min. Subsequently the maximum and minimum limits on the output torque in the $T_X/T_Y$ space can be retransformed out of the $T_X/T_Y$ space to the maximum and minimum raw output torques which are output to the output torque range determination algorithm ('Output Torque Range') 520, and plotted ('Output Torque Maximum Raw' and 'Output Torque Minimum Raw').

The maximum and minimum raw output torques are constrained by the net immediate output torque and the immediate accelerator output torque to limit operation of the powertrain system based upon the operator torque request. Exemplary data illustrating the concept of constraining the maximum and minimum raw output torques is shown, resulting in a constrained minimum output torque ('Output Torque Minimum Range') and a constrained maximum output torque ('Output Torque Maximum Range') that can be determined taking into account the net immediate output torque and the immediate accelerator output torque (not shown).

The input torque range is determined in the input torque constraints algorithm 530 based upon the minimum and maximum output torques as constrained by the minimum and maximum motor torques for the first and second electric machines 56 and 72. The input torque range can be determined using parametric Eqs. 1, 2, and 3, reconfigured to solve for input torque. By way of example, when the lead operating range state of the transmission 10 is in Mode 1, the parametric torque equations of Eqs. 1, 2, and 3 are set forth below.

$$T_{M1}=T_I=T_A \text{ to } T_I*T_A+T_B \text{ to } T_I*T_B+\text{Misc}\_T_I \quad [1H]$$

$$T_{M2}=T_O=T_A \text{ to } T_O*T_A+T_B \text{ to } T_O*T_O+\text{Misc}\_T_O \quad [2H]$$

$$T_{M3}=T_{C1}=T_A \text{ to } T_{C1}*T_A+T_B \text{ to } T_{C1}*T_B+\text{Misc}\_T_{C1} \quad [3H]$$

When the lead operating range state of the transmission 10 is in Mode 2, the parametric torque equations of Eqs. 1, 2, and 3 are as follows.

$$T_{M1}=T_I=T_A \text{ to } T_I*T_A+T_B \text{ to } T_I*T_B+\text{Misc}\_T_I \quad [1I]$$

$$T_{M2}=T_O=T_A \text{ to } T_O*T_A+T_B \text{ to } T_O*T_O+\text{Misc}\_T_O \quad [2I]$$

$$T_{M3}=T_{C2}=T_A \text{ to } T_{C2}*T_A+T_B \text{ to } T_{C2}*T_B+\text{Misc}\_T_{C2} \quad [3I]$$

Eqs. 1, 2, and 3 can be solved as described hereinabove, with $T_{M2}=T_O$, and $T_O$ is defined as ranging from the constrained minimum output torque ('Output Torque Minimum Range') to the constrained maximum output torque ('Output Torque Maximum Range'). The input torque range is plotted in FIG. 6 as the maximum and minimum input torques after any shaping, e.g., filtering that can occur in the input torque shaping algorithm ('Input Torque Constraint Shaping') 540 to determine minimum and maximum hybrid input torques ('Input Torque Hybrid Minimum' and 'Input Torque Hybrid Maximum'). A preferred maximum input torque can be determined, comprising the maximum input torque that meets the constrained maximum output torque and meets the motor torque constraints for the first and second electric machines 56 and 72 and meets the available battery power for the ESD 74, shown as point H. A preferred minimum input torque can be determined, comprising the minimum input torque that meets the constrained minimum output torque and meets the motor torque constraints for the first and second electric machines 56 and 72 and meets the available battery power for the ESD 74, shown as point J.

The preferred minimum and maximum input torques define maximum and minimum limits on the input torque in the $T_X/T_Y$ space. The preferred minimum and maximum input torques can be retransformed out of the $T_X/T_Y$ space to the minimum and maximum hybrid input torques ('Input Torque Hybrid Minimum' and 'Input Torque Hybrid Maximum'), which are output to the engine torque conversion calculator 355 and converted to minimum and maximum engine torques ('Engine Torque Hybrid Minimum' and 'Engine Torque Hybrid Maximum' respectively), by taking into account parasitic and other loads introduced between the engine 14 and the transmission 10. The minimum and maximum engine torques are input to the engine response type determination scheme 380 to constrain operation of the engine 14, including determining whether the engine response type is active or inactive.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a hybrid transmission including torque machines and an energy storage device connected thereto, the hybrid transmission operative to transfer power between an input member and an output member and the torque machines, wherein a control module performs the following steps comprising:
monitoring operating parameters of the hybrid transmission;
monitoring an operator demand for power;
determining an output torque range to the output member based upon states of the operating parameters of the hybrid transmission;
constraining the output torque range to the output member based upon the operator demand for power;
determining input torque constraints to the input member based upon the constrained output torque range to the output member; and controlling operation of an engine coupled to the input member based upon the input torque constraints to the input member.

2. The method of claim 1, further comprising:
determining maximum and minimum power constraints for the energy storage device;
determining maximum and minimum motor torque outputs from the torque machines; and
determining the output torque range to the output member based upon the maximum and minimum power constraints for the energy storage device and the maximum and minimum motor torque outputs from the torque machines.

3. The method of claim 1, further comprising:
monitor operator inputs to an accelerator pedal and a brake pedal;
determining an immediate accelerator torque request and a net accelerator torque request based upon the operator inputs to the accelerator pedal and the brake pedal; and
constraining the output torque range to the output member based upon the immediate accelerator torque request and a net accelerator torque request.

4. The method of claim 1, further comprising:
formulating equations representing maximum and minimum motor torque constraints for the first and second torque machines and equations representing maximum and minimum power constraints for the energy storage device;
formulating a parametric equation representing the output torque;
formulating a parametric equation representing a range for a first torque constraint;
formulating a parametric equation representing a range for a second torque constraint;
transforming the equations representing the maximum and minimum power constraints for the energy storage device to equations comprising concentric circles having corresponding radii;
transforming the equations representing the maximum and minimum motor torque constraints for the first and second torque machines to equations comprising lines;
transforming the parametric equation representing the range for the first torque constraint;
transforming the parametric equation representing the range for the second torque constraint;
transforming the parametric equation representing the output torque; and
determining transformed minimum and maximum raw output torques based upon the transformed minimum and maximum motor torque constraints for the first and second torque machines, the transformed maximum and minimum power constraints for the energy storage device, the transformed range for the first torque constraint and the transformed range for the second torque constraint.

5. The method of claim 4, further comprising simultaneously solving the parametric equations for the transformed minimum and maximum motor torque constraints for the first and second torque machines, the transformed maximum and minimum power constraints for the energy storage device, the transformed range for the first torque constraint and the transformed range for the second torque constraint to determine the transformed minimum and maximum raw output torques.

6. The method of claim 4, further comprising retransforming the transformed minimum and maximum raw output torques to determine the minimum and maximum raw output torques from the transmission.

7. The method of claim 4, further comprising:
formulating a first parametric torque equation representing the input torque;
formulating a second parametric torque equation representing the minimum and maximum raw output torques;
formulating a third parametric torque equation representing a range for a second torque constraint;
transforming the first, second, and third parametric equations; and
determining transformed minimum and maximum raw input torques based upon the transformed minimum and maximum motor torque constraints for the first and second torque machines, the transformed maximum and minimum power constraints for the energy storage device, the transformed range for the minimum and maximum raw output torques and the transformed range for the second torque constraint.

8. The method of claim 7, further comprising
simultaneously solving the parametric equations for the transformed minimum and maximum motor torque constraints for the first and second torque machines, the transformed maximum and minimum power constraints for the energy storage device, the transformed range for the minimum and maximum raw output torques and the transformed range for the second torque constraint to determine the transformed minimum and maximum raw input torques.

9. The method of claim 7, further comprising retransforming the transformed minimum and maximum raw input torques to determine the minimum and maximum raw input torques.

10. A method for controlling a powertrain including an engine mechanically coupled to a transmission, the transmission operative in an operating range state to transfer power between the engine and first and second electric machines and an output member by selectively applying torque transfer clutches, the first and second electric machines electrically connected to an electrical energy storage device, wherein a control module performs the following steps comprising:
monitoring operating parameters of the hybrid transmission;
monitoring an operator demand for power;
determining an output torque range to the output member based upon states of the operating parameters of the hybrid transmission;
constraining the output torque range to the output member based upon the operator demand for power;
determining input torque constraints to the input member based upon the constrained range of output torque to the output member;
constraining engine torque based upon the input torque constraints to the input member and the operator demand for power; and
controlling operation of the engine based upon the constrained engine torque.

11. The method of claim 10, further comprising determining available battery power from the electrical energy storage device and determining maximum and minimum motor torques from the first and second electric machines, and determining the output torque range to the output member based thereon.

12. The method of claim 11, further comprising:
determining maximum and minimum power constraints for the electrical energy storage device;
determining maximum and minimum motor torques from the first and second electric machines; and determining the output torque range to the output member based upon the maximum and minimum power constraints for the electrical energy storage device and the maximum and minimum motor torques from the first and second electric machines.

13. Method for controlling a hybrid transmission including first and second torque machines and an energy storage device connected thereto, the hybrid transmission operative to transfer power between an input member and an output member and the first and second torque machines, wherein a control module performs the following steps comprising:

monitoring operating parameters of the hybrid transmission;

monitoring an operator demand for power;

determining an output torque range to the output member based upon states of the operating parameters of the hybrid transmission;

constraining the output torque range to the output member based upon the operator demand for power; and determining input torque constraints to the input member based upon the constrained range of output torque to the output member.

* * * * *